Dec. 25, 1962 W. M. BURROWS 3,069,805
AMUSEMENT DEVICE
Filed Feb. 8, 1960 3 Sheets-Sheet 1

INVENTOR.
William M. Burrows
BY Harold E. Cole
Attorney

Dec. 25, 1962 W. M. BURROWS 3,069,805
AMUSEMENT DEVICE
Filed Feb. 8, 1960 3 Sheets-Sheet 2

INVENTOR.
William M. Burrows
BY Harold E. Cole
Attorney

Dec. 25, 1962  W. M. BURROWS  3,069,805
AMUSEMENT DEVICE
Filed Feb. 8, 1960  3 Sheets-Sheet 3

INVENTOR.
William M. Burrows
BY Harold E. Cole
Attorney

United States Patent Office 3,069,805
Patented Dec. 25, 1962

3,069,805
AMUSEMENT DEVICE
William M. Burrows, 5 Oneida Circle, Winchester, Mass.
Filed Feb. 8, 1960, Ser. No. 7,452
4 Claims. (Cl. 46—16)

This invention relates to an amusement device, especially one having conduit means through which a ball may travel.

One object of my invention is to provide an amusement device having conduits connecting different supporting members, or blocks, through which conduits a ball travels.

Another object is to provide coupling means for said conduits which are supported by supporting members or blocks whereby the conduits may easily be connected together and extend from one supporting member to another.

Still another object is to so form said supporting members or blocks that they can be arranged one on top of another or side by side, or both, and with side frames having holes therethrough to receive conduits, so that an assembly of said blocks and conduits may be added to from time to time, without disturbing what has previously been assembled.

A further object is to provide an assembly of blocks with conduits therein having a continuous passage that runs in varying directions such as downwardly, sideways and upwardly, thus enabling the user to determine the directions of travel of a ball or the like within the conduit assembly.

The foregoing and other objects which will appear as the nature of the invention is better understood, may be accomplished by a construction, combination and arrangement of parts such as is disclosed by the drawings. The nature of the invention is such as to render it susceptible to various changes and modifications, and, therefore, I am not to be limited to the construction disclosed by the drawings nor to the particular parts described in the specification; but am entitled to all such changes therefrom as fall within the scope of my claims.

Figure 1:
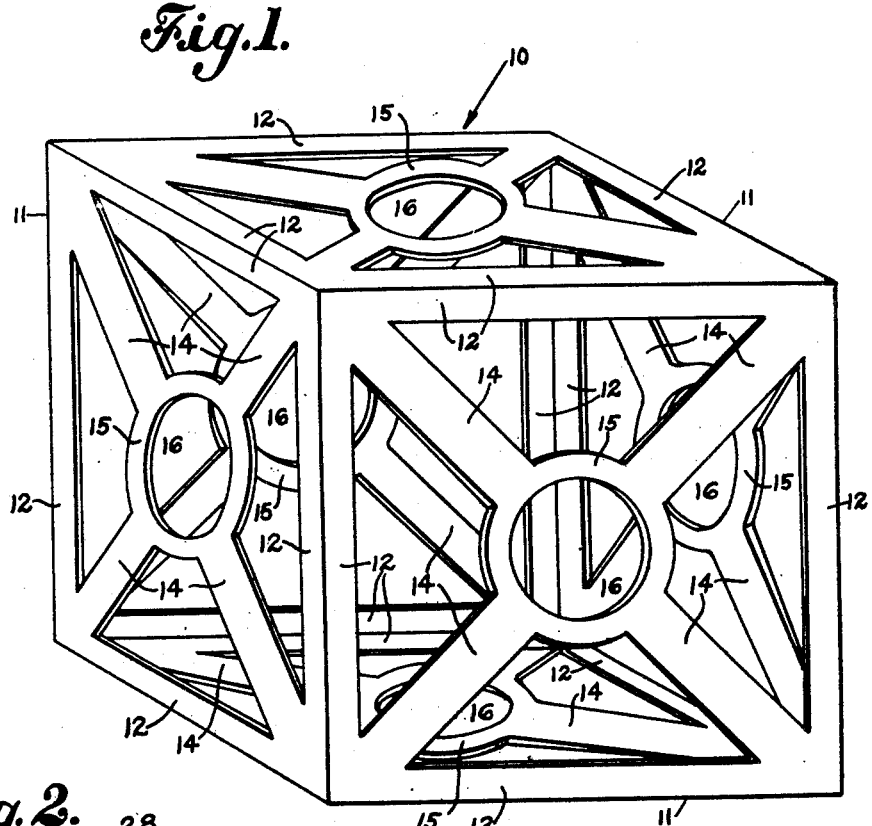
FIG. 1 is a perspective view of a block used in my device.
Figure 2:
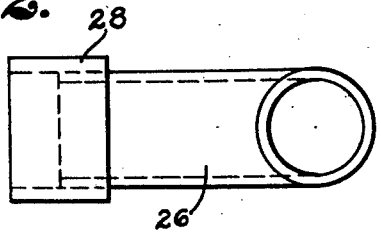
FIG. 2 is a top plan view of a curved conduit.
Figure 3:
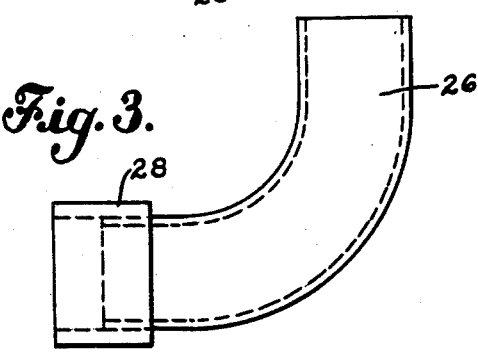
FIG. 3 is a side elevational view of a curved conduit.

As illustrated, my amusement device has an assembly supporting member shown as a hollow block 10 having a plurality of formal sides or faces, each of which is formed by a frame 11 that, as shown, is skeleton-shaped, having an outside border 12 and arms 14 extending therefrom to a circular member 15 having a hole 16 therethrough that is preferably located at the center of said side frame. This provides an open-work frame so the interior of the block is visible from all sides. However, said sides could be solid and transparent or translucent, with a said hole such as 16 extending therethrough. Any of said sides can serve as a bottom or a top, as well as a side, depending somewhat upon how the block is placed in association with another block or blocks. Also said block may be entirely open at some sides instead of having side frames.

Since I may use a plurality of blocks associated together, I connect them by conduits or tubes later described, that preferably are transparent or translucent and may be formed of plastic, glass or the like. I may use a straight conduit 24, and also a curved or angularly-shaped conduit 26. Two or more of said conduits are connectional and communicate with each other when connected to provide a continuous passage through an assembly of conduits.

Figure 4:
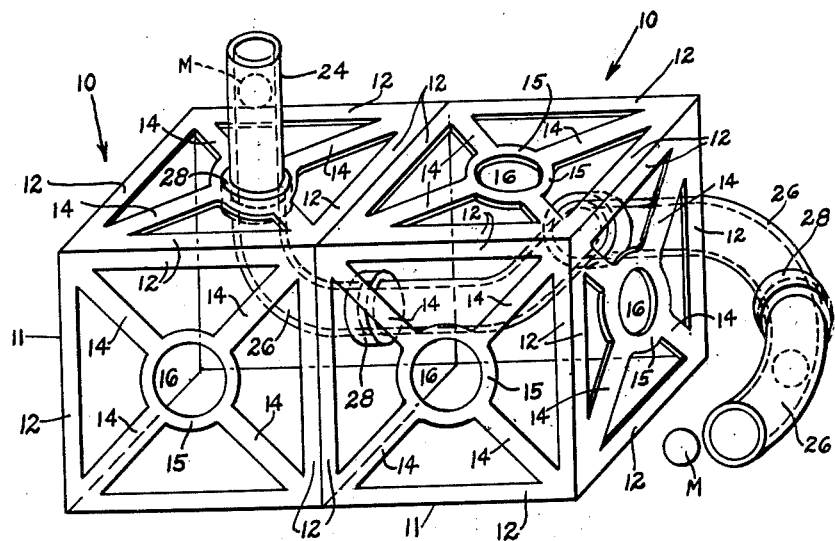
FIG. 4 is a perspective view of an assembly of two blocks with connecting conduits.
Figure 5:
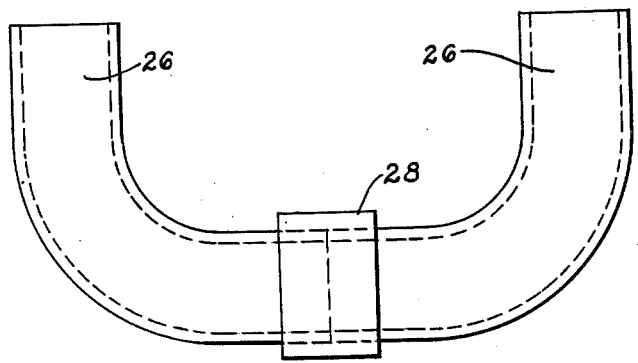
FIG. 5 is a side elevational view showing two curved conduits connected.

As shown in said FIG. 4 said conduits, 24 or 26, may be joined by a coupling 28 which is large enough interiorly to receive the ends of said conduits 24 or 26 so that either end may extend into, and make a contact fit with, said coupling. Said coupling is of an exterior size to extend into said hole 16, and preferably make a contact fit with the side frame, consequently when two couplings are joined they remain so until forcibly separated. Said couplings 28 could firmly fit in said holes 16 of the side frame and remain there, if desired. Likewise they could be attached to an end of a conduit and remain there thereby serving as a coupling end for a coupling. Said coupling 28 may be made of resilient material such as a rubber composition, or a flexible fiber, for instance.

Figure 9:
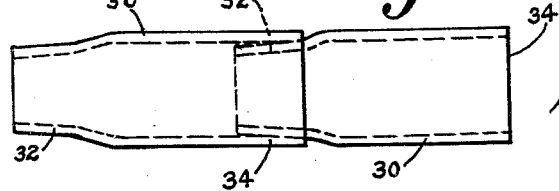
FIG. 9 is a side elevational view of a modification showing two conduits connected with a smaller end of one conduit extending into the larger end of the other.

In said FIG. 9 I show another form of conduit 30 which has a relatively large end 34 interiorly, and an opposite end 32 that is relatively small interiorly. A said small end 32 of one conduit fits into a large end 34 of another conduit, preferably making a firm contact fit so the connection will remain as long as desired.

In assembling my device I place a first said supporting member or block 10 next to another or second said block, and if each has a hole 16 in adjacent side frames 11, as heretofore explained, said holes must be in alinement. However, a side of block that is entirely open may be placed next to a block having a side frame. Said blocks 10 may be arranged side by side, as shown in said FIG. 4, or one upon the other. As shown in said FIG. 4, a straight conduit 24 extends upwardly and a said coupling 28 snugly fits into a hole 16 in the first block (shown at the left). One end of a curved conduit 26, which latter is shown as defining a right angle between its two opposite ends, extends into said coupling 28 which latter extends into a hole 16 in the second block, which is at the right. Thus the two conduits 24 and 26 are connected and communicate with each other. Also the two blocks are connected thereby.

The other end of said curved conduit 26, shown in FIG. 4, extends into the space within said second block and into another hole 16 in said second block. If it is desired to have further travel by a ball such as a marble or colored agate M, through the conduits, another curved conduit 26, for instance, may be connected to the aforementioned curved conduit by means of a coupling 28. Still another curved conduit 26 may likewise be connected, as shown in said FIG. 4. The latter two curved conduits extend outside said blocks 10 and they are connected by a coupling 28 as shown. This gives additional travel to said marble M. Of course, the curved conduits could be replaced by straight conduits if desired. If only a single conduit were used, it would extend from a hole 16 in one block to a hole 16 in another block, to thereby connect two blocks, preferably using a coupling 28 which would fit into holes 16 in the side frames 11 of two blocks that are adjacent each other.

Figure 6:
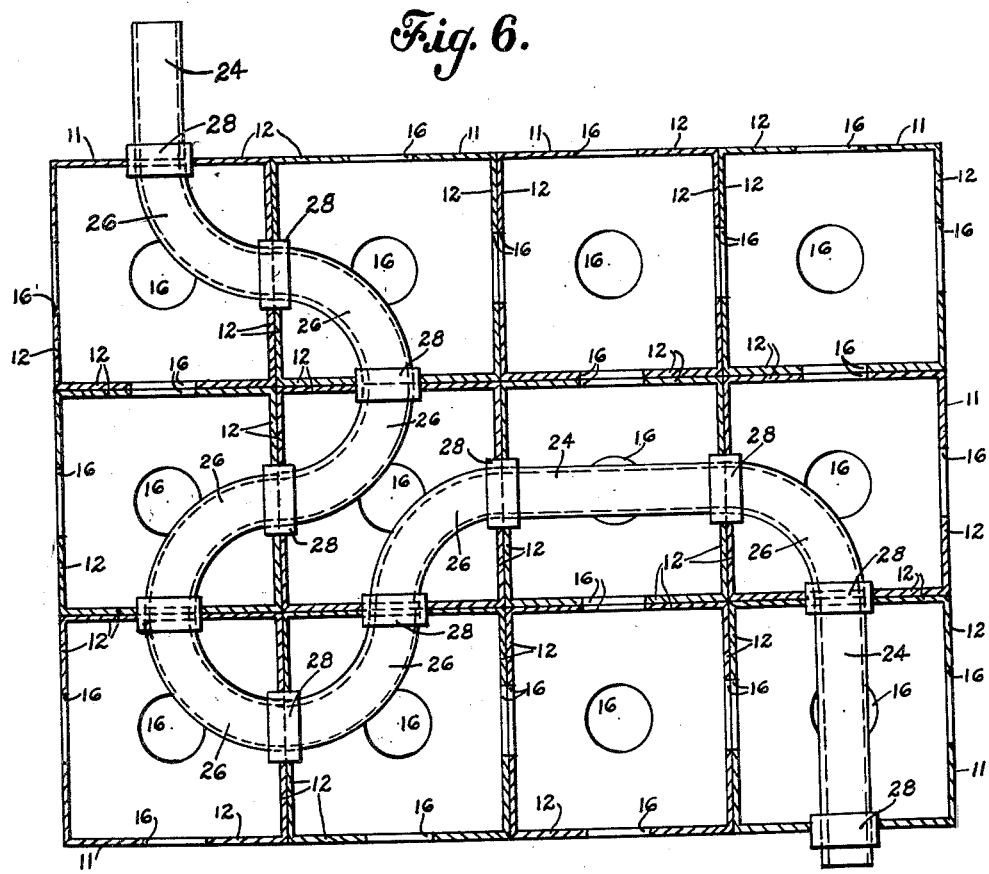
FIG. 6 is a vertical sectional view through an assembly of blocks, with the conduits connecting the blocks shown in full lines.

In said FIG. 6 I show a relatively large assembly of blocks 10 some of which are side by side and others are one upon another. The upper conduit 24 is straight, as is an intermediate one and also the lower one, as shown. The remainder are curved conduits 26. Each conduit is shown connected to another by a coupling 28 which latter fits into holes 16 in the sides of said blocks. In such an assembly some of the conduits, at an intermediate point, may be lower than the conduits connected thereto and which extend progressively beyond it. The marble M will complete its run through the complete conduit assembly, as shown, despite this inclination upwardly of a part thereof, since it acquires considerable speed in passing downwardly through the straight conduit when it starts at the upper part of the assembly.

Figure 7:
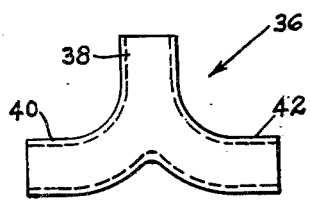
FIG. 7 is a side elevational view of a modified form of curved conduit.
Figure 8:
FIG. 8 is a top plan view of the curved conduit shown in FIG. 7.

In FIG. 7 I show a modified form of conduit 36 having an entrance portion 38 and two side branches 40 and 42 extending in opposite directions therefrom. Said entrance portion 38 would extend into a said hole 16 located preferably at a top or uppermost side frame of a block 10, and the two side branches would extend into holes 16 in the sides of said block laterally opposite each other. Another said conduit may be connected to either said side branch 40 or 42. In this construction the marble M may pass from said entrance portion 38 into one or the other of said side branches 40 and 42, thus providing some uncertainty as to which path the marble M will take. If it takes one path, movement of the marble may terminate at the end of a said side branch, whereas if it takes another path it will continue into another conduit connected to a said side branch, thus traveling a greater distance. The latter would be considered a greater accomplishment when playing a competitive game with my device.

While I have shown a block 10 that is square, it could take other shapes that would have side frames. Likewise said curved conduit 26 may be curved to varying degrees and the holes 16 in said side frames need not necessarily be in the center thereof. Likewise said conduits may be made of material that is somewhat flexible so they could be bent to define different degrees of angles between one end and another.

The blocks could be made of wood, metal, strong cardboard, plastic or the like.

What I claim is:

1. An amusement device comprising a plurality of hollow toy blocks each having at least three open-work sides, two of said sides of a first of said blocks extending in angular relationship to each other and each having an opening therethrough, a separate and curved first conduit member detachably extending from and between the openings in said first block two sides, a first of said sides of the second of said blocks extending parallel with one of said sides of said first block and having an opening therethrough, a second of said sides of the second of said blocks extending in angular relationship to the first said side thereof and having an opening therethrough, and a second separate and curved, detachable, conduit member connected to the first said conduit member and extending therefrom and from and between said two openings in the second of said blocks, said conduits being visible through said block open-work.

2. An amusement device comprising a plurality of hollow toy blocks each having at least three open-work sides, two of said sides of a first of said blocks extending in angular relationship to each other and each having an opening therethrough, a separate and curved first conduit member detachably extending from and between the openings in the latter two said sides, two of said sides of the second of said blocks extending parallel with one of said sides of said first block and each having an opening therethrough, and a second and curved, detachable, conduit member connected to the first said conduit member and extending therefrom and from and between the said openings in said two parallel sides of the second of said blocks, said conduits being visible through said block open-work.

3. An amusement device comprising at least three hollow toy blocks one above another each having at least three open-work sides, two of said three sides of a first of said blocks extending in angular relationship to each other and each having an opening therethrough, a separate and curved first conduit member detachably extending from and between the openings in the latter two said sides, a first of said sides of the second of said blocks extending parallel with one of said three sides of said first block and having an opening therethrough, a second of said sides of the second of said blocks extending in angular relationship to the first said side of said second block and having an opening therethrough, and a second separate and curved, detachable, conduit member connected to the first said conduit member and extending therefrom and from and between said two openings in the second of said blocks, the first of said sides of the third of said blocks extending parallel with said first side of the said second block and having an opening therethrough, and a third separate and detachable conduit member extending from the said second conduit member to and into said opening in a side of the third said block, said conduits being visible through said block open-work.

4. An amusement device comprising at least three hollow toy blocks each having at least three open-work sides each having an opening therethrough, and three separate conduit members in communication with each other and detachably extending between three said blocks respectively from a said opening in a side of one said block to a said opening in a side of the second of said blocks and to a said opening in a side of a third of said blocks thus providing a continuous conduit between said three blocks.

References Cited in the file of this patent

UNITED STATES PATENTS

| 173,294 | Hockman | Feb. 8, 1876 |
| 1,465,637 | Goss | Aug. 21, 1923 |
| 1,519,850 | Lautzenheiser | Dec. 16, 1924 |
| 2,425,729 | Sherbinin | Aug. 19, 1947 |
| 2,662,336 | Zalkind | Dec. 15, 1953 |
| 2,752,725 | Unsworth | July 3, 1956 |
| 2,752,727 | Cotton | July 3, 1956 |
| 2,861,388 | Favaretto | Nov. 25, 1958 |

FOREIGN PATENTS

| 446,313 | Germany | June 29, 1927 |